(12) United States Patent
Ito et al.

(10) Patent No.: US 10,776,906 B2
(45) Date of Patent: Sep. 15, 2020

(54) RADIOGRAPHIC IMAGE PROCESSING DEVICE, STORAGE MEDIUM, AND RADIOGRAPHIC IMAGE PROCESSING METHOD

(71) Applicant: KONICA MINOLTA, INC., Chiyoda-ku, Tokyo (JP)

(72) Inventors: Ryohei Ito, Hino (JP); Tatsuya Takagi, Mitaka (JP)

(73) Assignee: KONICA MINOLTA, INC., Tokyo (JP)

( * ) Notice: Subject to any disclaimer, the term of this patent is extended or adjusted under 35 U.S.C. 154(b) by 108 days.

(21) Appl. No.: 16/058,715

(22) Filed: Aug. 8, 2018

(65) Prior Publication Data
US 2019/0073755 A1 Mar. 7, 2019

(30) Foreign Application Priority Data
Sep. 7, 2017 (JP) ................................. 2017-171647

(51) Int. Cl.
*G06K 9/00* (2006.01)
*G06T 5/00* (2006.01)
*G06T 5/40* (2006.01)

(52) U.S. Cl.
CPC .............. *G06T 5/009* (2013.01); *G06T 5/002* (2013.01); *G06T 5/008* (2013.01); *G06T 5/40* (2013.01);
(Continued)

(58) Field of Classification Search
CPC .. H04N 1/4074; H04N 1/407; H04N 5/37213; H04N 5/32; H04N 7/18;
(Continued)

(56) References Cited

U.S. PATENT DOCUMENTS

| 6,101,273 A | 8/2000 | Matama | |
| 6,694,052 B1 * | 2/2004 | Matama | ............... H04N 1/4074 358/461 |
| 6,868,190 B1 * | 3/2005 | Morton | ..................... G06T 5/00 348/208.13 |

(Continued)

FOREIGN PATENT DOCUMENTS

| EP | 0772342 A2 * | 5/1997 | ........... H04N 1/4074 |
| EP | 0784292 A2 * | 7/1997 | ............. G06T 5/004 |

(Continued)

*Primary Examiner* — Mahendra R Patel
(74) *Attorney, Agent, or Firm* — Holtz, Holtz & Volek PC

(57) ABSTRACT

A radiographic image processing device includes a hardware processor which sets a reference signal value in a range of a signal value of a pixel in a processing object region in a radiographic image, determines a conversion rate to convert a dynamic range in a high signal region and a conversion rate to convert a dynamic range in a low signal region respectively based on the reference signal value, determines a contrast modification rate which indicates an extent of processing of contrast modification in the signal region where the dynamic range is converted in the processing object region based on the reference signal value or the conversion rate, converts a dynamic range of a signal region in the processing object region based on the determined conversion rate, and performs contrast modification in the signal region in the processing object region based on the determined contrast modification rate.

12 Claims, 9 Drawing Sheets

(52) U.S. Cl.
CPC . *G06T 2200/28* (2013.01); *G06T 2207/10116* (2013.01); *G06T 2207/20072* (2013.01); *G06T 2207/20208* (2013.01); *G06T 2207/30008* (2013.01)

(58) Field of Classification Search
CPC ............... H04N 9/8205; H04N 5/262; H01L 27/14663; G01T 1/20; G06T 2207/10024; G06T 5/00; G06T 15/009; G06T 220/10116; G06T 5/40; G01N 23/04; G06K 9/40; G06K 9/00; A61B 6/00; A61B 6/4233; A61B 6/4411; A61B 6/4283; A61B 6/4405; A61B 6/56
USPC ................. 382/132, 166, 278, 169; 378/62
See application file for complete search history.

(56) References Cited

U.S. PATENT DOCUMENTS

| | | | | |
|---|---|---|---|---|
| 7,321,674 | B2* | 1/2008 | Vuylsteke | G06T 5/009 382/128 |
| 2003/0161518 | A1* | 8/2003 | Vuylsteke | G06T 5/009 382/128 |
| 2004/0125999 | A1* | 7/2004 | Iordache | G06T 5/004 382/132 |
| 2005/0265515 | A1* | 12/2005 | Tashiro | A61B 6/032 378/20 |
| 2007/0104387 | A1* | 5/2007 | Han | H04N 5/57 382/271 |
| 2008/0205785 | A1* | 8/2008 | Geiger | G06T 5/20 382/260 |
| 2011/0007873 | A1* | 1/2011 | Rudin | H04N 5/3415 378/62 |
| 2011/0261257 | A1* | 10/2011 | Terry | G06K 9/00221 348/515 |
| 2011/0305382 | A1* | 12/2011 | Takahashi | A61B 6/5211 382/132 |
| 2013/0140467 | A1* | 6/2013 | Kitano | H04N 5/37213 250/393 |
| 2014/0037206 | A1* | 2/2014 | Newton | H04N 1/646 382/166 |
| 2014/0322733 | A1* | 10/2014 | Suarez | G01N 33/573 435/7.92 |
| 2015/0238159 | A1* | 8/2015 | Al Assad | A61B 6/025 378/5 |
| 2016/0029987 | A1* | 2/2016 | Langan | H04N 1/4074 358/461 |
| 2016/0135764 | A1* | 5/2016 | Wojcik | A61B 6/4233 |
| 2016/0249029 | A1* | 8/2016 | Takasumi | G06T 5/00 |
| 2016/0302755 | A1* | 10/2016 | Takagi | A61B 6/505 |

FOREIGN PATENT DOCUMENTS

| | | |
|---|---|---|
| JP | H09130609 A | 5/1997 |
| JP | 2003284713 A | 10/2003 |

* cited by examiner

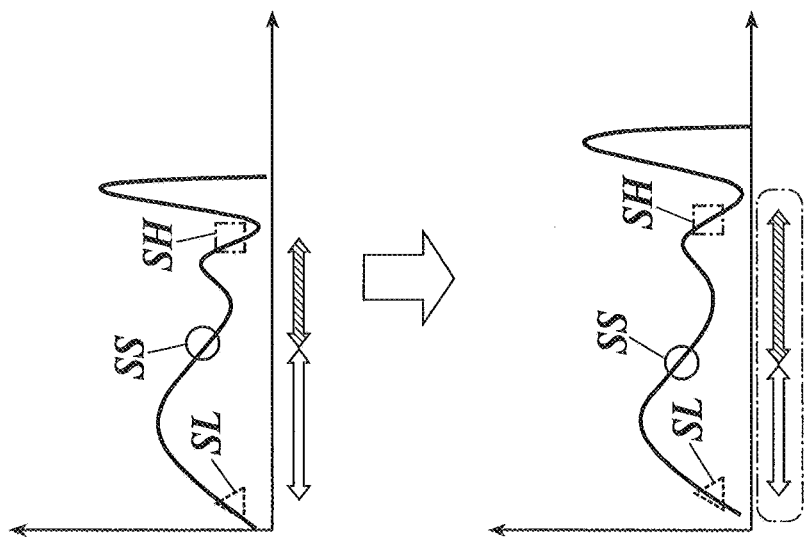
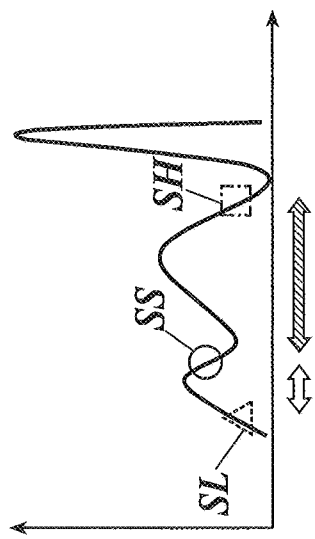
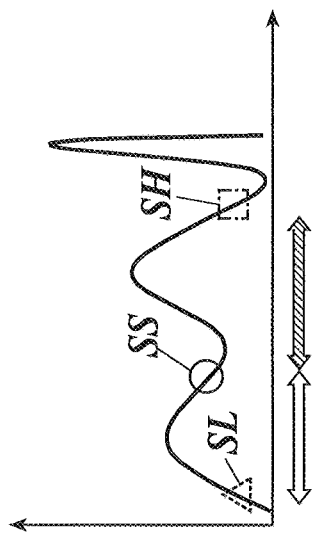

SL  SSa  SSb  SH

RADIOGRAPHIC IMAGE PROCESSING DEVICE, STORAGE MEDIUM, AND RADIOGRAPHIC IMAGE PROCESSING METHOD

This application is based upon and claims the benefit of priority under 35 USC 119 of Japanese Patent Application No. 2017-171647 filed on Sep. 7, 2017, the entire disclosure of which, including the description, claims, drawings, and abstract, is incorporated herein by reference in its entirety.

BACKGROUND

Technological Field

The present invention relates to a radiographic image processing device, a storage medium and a radiographic image processing method.

Description of the Related Art

Image processing is performed on radiographic images in view of improving clarity or such before images are displayed.

However, radial rays pass through fats and muscles with thickness different for each subject in taking radiographic images, because subjects have diverse physical features. Therefore, the ratio between the high density region and the low density region significantly varies for each subject in radiographic images, even when the subject region is common. When a homogeneous image processing is performed on such radiographic images with diverse densities or such, it is possible that appropriate images to be displayed are not obtained.

In view of such a problem, in the conventional image processing, such a technique as disclosed in Japanese Patent Application Laid Open Publication No. 2003-284713 is used so as to obtain images suitable for physical features and target regions of subjects. Specifically, the technique includes analyzing a histogram of a radiographic image, recognizing physical features and a target region of the target based on the analysis results, correcting image processing parameters for the target region corresponding to recognized physical features, and performing an image processing using the corrected image processing parameters.

However, the appropriate images to be displayed could not yet be obtained with the technique disclosed in Japanese Patent Application Laid Open Publication No. 2003-284713, because the image processing is performed homogeneously on the whole image.

Recently such a technique as disclosed in Japanese Patent Application Laid Open Publication No. H9-130609 has been employed to obtain appropriate images to be displayed irrespective of the ratio between the high density region and low density region. Specifically, the technique is generating a histogram of image signals, calculating a dynamic range of the image signals based on the histogram, setting a dynamic range compression rate respectively for the region with signal values higher and lower than the reference signal value of the dynamic range, performing a dynamic range compression processing at the set compression rates in the high density region and the low density region of the radiographic image, and then performing a gradient processing in the radiographic image in order to recover the contrast diminished by the dynamic range compression.

In the technique disclosed in Japanese Patent Application Laid Open Publication No. H9-130609, the dynamic range compression processing is performed only on the region excluding the main region by setting the density of the main target region as the reference value. The image processing suitable for the physical features and target regions of subjects can then be performed, while preventing the diminishment of the contrast of the main region.

In the technique disclosed in Japanese Patent Application Laid Open Publication No. H9-130609, however, the gradient processing to recover the contrast is performed homogeneously on the whole image, and eventually, the contrast of the main target region is enhanced, though having been prevented from being diminished. Therefore, the contrast of the whole image cannot be equivalent.

SUMMARY

The present invention has been conceived in view of the above problems, and an object of the present invention is preventing the difference of density caused by the difference of target's body thickness in each radiographic image as well as controlling the inconsistency of contrast for each region in each radiographic image, in the radiographic image processing device which can perform a processing to convert the dynamic range and to modify the contrast on radiographic images.

To achieve at least one of the abovementioned objects, according to an aspect of the present invention, a radiographic image processing device includes a hardware processor which:

sets a reference signal value in a range of a signal value of a pixel in a processing object region in a radiographic image;

determines a conversion rate to convert a dynamic range in a high signal region which has a signal value larger than the reference signal value in the processing object region and a conversion rate to convert a dynamic range in a low signal region which has a signal value smaller than the reference signal value in the processing object region respectively based on the reference signal value;

determines a contrast modification rate which indicates an extent of processing of contrast modification in the signal region where the dynamic range is converted in the processing object region based on the reference signal value or the conversion rate;

converts a dynamic range of a signal region in the processing object region based on the determined conversion rate corresponding to the signal region; and performs contrast modification in the signal region in the processing object region based on the determined contrast modification rate corresponding to the signal region.

BRIEF DESCRIPTION OF THE DRAWINGS

The present invention will be more fully understood from the detailed description given hereinbelow and the appended drawings which are given by way of illustration only, and thus are not intended as a definition of the limits of the present invention, and wherein:

FIGS. 10A to 10C are histograms of a radiographic image before and after the radiographic image processing device converts the dynamic range;

DETAILED DESCRIPTION OF EMBODIMENTS

Figure 1:
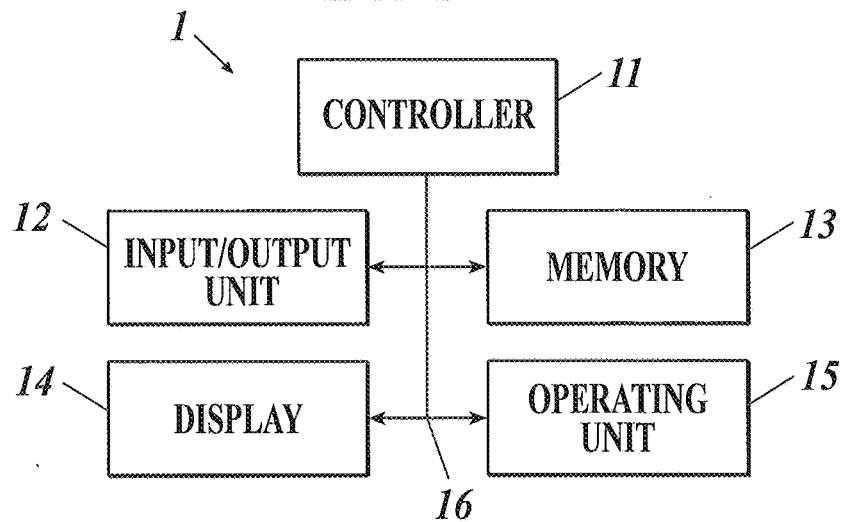
FIG. 1 is a block diagram of a configuration of a radiographic image processing device in accordance with the present embodiment.

The embodiments of the present invention are described hereinafter with reference to the drawings. However, the scope of the invention is not limited to the examples shown in the drawings.

[Configuration of Radiographic Image Processing Device]

First, a configuration of the radiographic image processing device 1 in accordance with the present embodiment is described. FIG. 1 is a block diagram of a configuration of the radiographic image processing device 1.

The radiographic image processing device 1 is for performing a predetermined image processing on image data of radiographic images obtained from the exterior.

The radiographic image processing device 1 may be connected to, though not shown in the drawings, a radiographic imaging system including a radial ray generating device, a radiographic imaging device, a console, and such, a radiology information system (RIS), or a picture archiving and communication system (PACS).

The radiographic image processing device 1 in accordance with the present invention may be configured with a console (the console may have functions of a radiographic image processing device).

The radiographic image processing device 1 is configured as a PC, a mobile terminal, or a dedicated device, and includes a controller 11, an input/output unit 12, a memory 13, a display 14, an operating unit 15, and such, as shown in FIG. 1. The sections 11 to 45 are connected with each other by a bus 16.

The controller 11 is configured to generally control the operation of each section of the radiographic image processing unit 1 with a CPU, RAM or such. Specifically, various processing programs stored in the memory 13 are read out and loaded in the RAM and the controller 11 performs various processings according to the processing programs.

The input/output unit 12 is for inputting image data of radiographic images from the exterior (a radiographic imaging device, console, or such) and outputting the processed image data to the exterior after image processing.

The input/output unit 12 may be configured to send and receive the image data to and from the radiology information system (RIS), or the picture archiving and communication system (PACS) connected via the communication network such as LAN (Local Area Network), WAN (Wide Area Network), or the Internet through a network interface. The input/output unit 12 may also be configured with a connector to which a cable can be inserted for the wired connection, or a port to which a USB memory, an SD card, or such can be inserted.

The memory 13 is configured with a hard disk drive (HDD), a semiconductor memory, and such, and stores processing programs to perform various processings such as the image processing described later, parameters necessary for executing the processing programs, conversion formulae or tables described later, files, and such.

The memory 13 may store the image data input from the exterior, and the processed image data after image processing performed by itself.

The memory 13 may be configured to store imaging order information, such as information on the target patient, target region, imaging direction, and various imaging conditions.

The display 14 is configured with an LCD monitor or such, and can display various images according to the command of displaying signals input from the controller 11.

The operating unit 15 is configured to include a keyboard with various keys, a pointing device such as a mouse, a touch panel superimposed on the display 14, and output the operation signals input according to the key operation to the keyboard, the mouse operation, or the point of touch operation on the touch panel.

Figure 2:
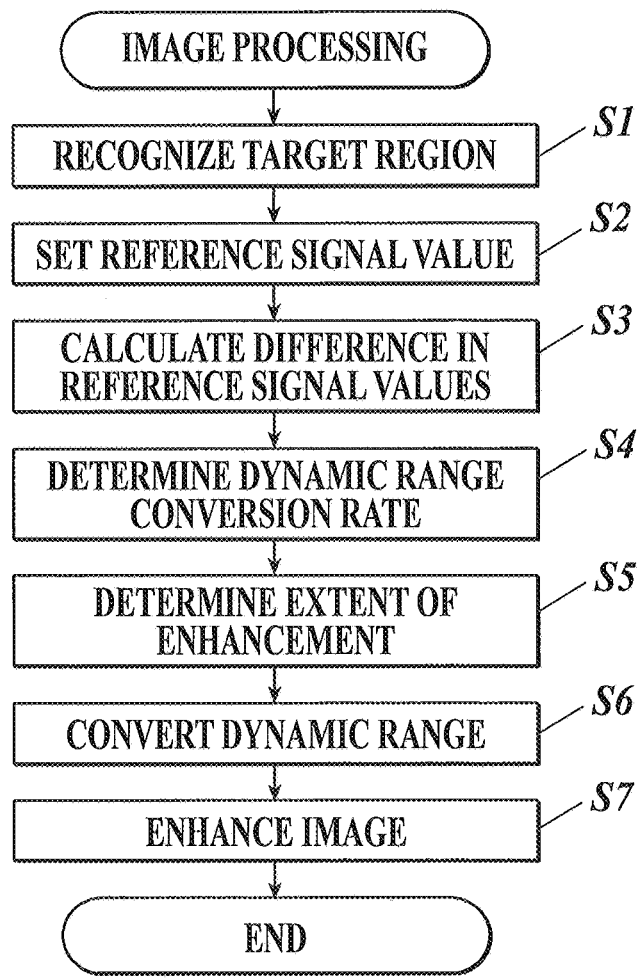
FIG. 2 is a flowchart of the image processing performed by the radiographic image processing device in FIG. 1.

Next, the image processing performed by the radiographic image processing device 1 is described in detail. FIG. 2 is a flowchart of the image processing.

The controller 11 of the radiographic image processing device 1 configured as described above performs the image processing shown by the flowchart in FIG. 2, which is triggered by an input of image data of a radiographic image from the exterior, an operation to order the operating unit 15 to start processing, an operation to select a target image data to be processed from multiple image data stored in the operating unit 15, or such, for example.

Figure 3:
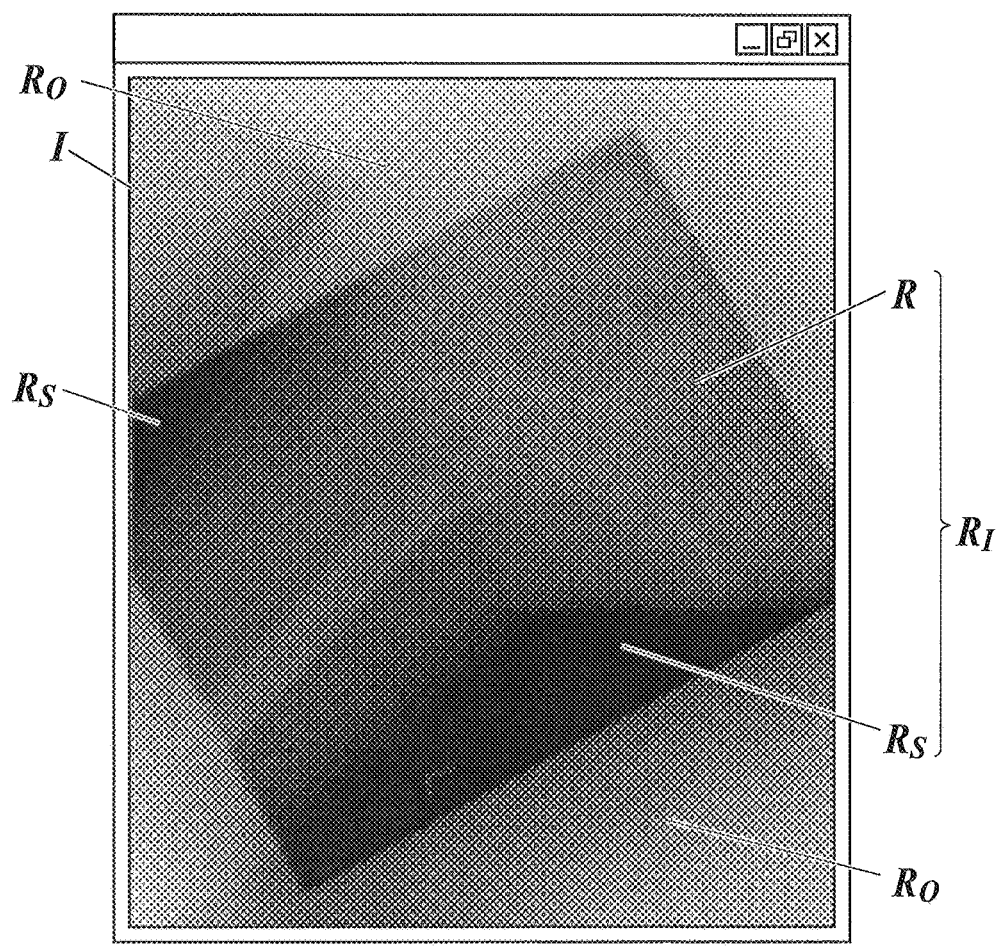
FIG. 3 is an example of a radiographic image which is to be processed by the radiographic image processing device in FIG. 1.

In the image processing, first, the target region where the target is imaged is recognized in the radiographic image I on which the image processing is performed (STEP S1). In imaging the radiographic image I, the field to be radiated by radial rays is sometimes narrowed. As shown in FIG. 3, the radiographic image I has, for example, the region inside irradiation field $R_I$ at the center, and the region outside irradiation field $R_O$ around the center which is scarcely irradiated and whitish. The region inside irradiation field $R_I$ has the region of signal saturation $R_S$ where the signal saturation causes blocked-up shadows, beside the target region R where a part of the target (femoral region in this example) is actually imaged, depending on the imaging method. In STEP S1, the target region R is extracted from the target radiographic image I (the region of signal saturation $R_S$ and the region outside irradiation field $R_O$ are omitted). In the present embodiment, the target region R is the processing object region in the present invention. The controller 11 functions as a means for recognizing regions in the present invention.

The target region R is partial in the radiographic image I in the example of FIG. 3. However, the processing object region may be the whole or any part of the radiographic image I, when the target region R covers the whole image.

After the target region R having been recognized, at least three reference signal values are set in the range of signal values of respective pixels of the processing object region in the radiographic image I (STEP S2).

In the present embodiment, a central signal value SS, a low signal value SL which is lower than the central signal value SS, and a high signal value SH which is higher than the central signal value SS are set at least. The central signal value SS, the low signal value SL, and the high signal value SH correspond respectively to the first signal value, the second signal value, and the third signal value in the present invention.

As for the method for setting each reference signal value, a histogram, image recognition, or any combination thereof may be used.

When a histogram is used for setting the reference signal values, a process to generate the histogram of the target region is performed before STEP S2 is executed. The controller 11 functions as a means for generating a histogram in the present invention. In the histogram, the horizontal axis represents signal values of multiple pixels of the target region, the body thickness of the target at each pixel, and the content rate of scattered radiation at each pixel, and the vertical axis represents the frequency of those elements.

In the histogram generation, it is preferable to remove the signal values corresponding to artificial objects from the distribution of the signal values.

The histogram may be generated separately in the region of bone and the remaining region of the whole target region.

The obtained histogram shows characteristics that vary according to the body thickness of the target.

Figure 4A:
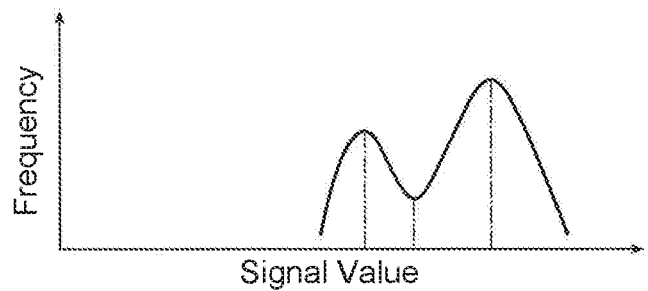
FIGS. 4A and 4B are histograms of the radiographic image of FIG. 3.

For example, in the histogram obtained from a radiographic image of a target whose body thickness is small, as shown in FIG. 4A, the distribution of signal values is displaced narrowly on the side of high signal values compared to the standard.

Figure 4B:
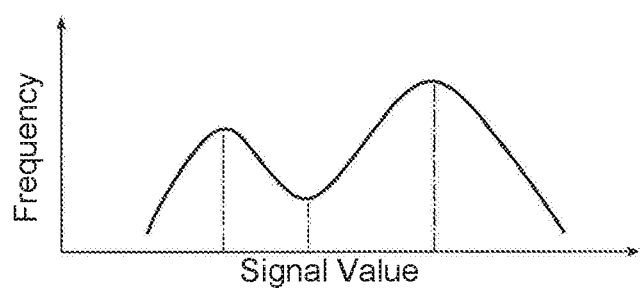

On the other hand, in the histogram obtained from a radiographic image of a target whose body thickness is large, as shown in FIG. 4B, the distribution of signal values is displaced broadly on the side of low signal values compared to the standard.

The graphs in FIGS. 4A and 4B are shown in order to clarify the description. There is no need to visualize the histogram in this process.

The central signal value SS is preferably set to a predetermined signal value in the region desired to be inspected most precisely in the target region (hereinafter referred to as a region of interest ROI).

Figure 5A:
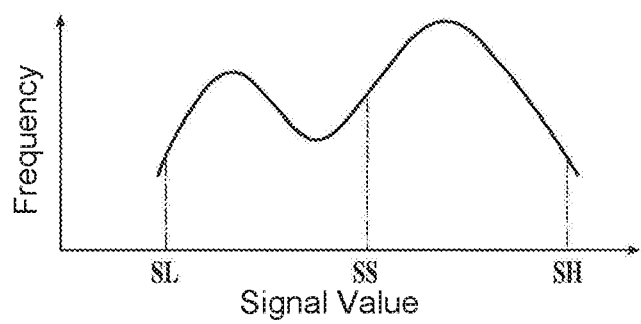
FIGS. 5A and 5B are conceptual illustrations of a method for setting reference signal values using the histogram of FIG. 4A or 4B.

When a histogram is used for setting the reference signal values, as shown in FIG. 5A, the central signal value SS may be set to a signal value at the 50th percentile of the distribution of all the pixels making up the target region, ordered from the highest (lowest) signal value.

The percentile rank of a signal value of pixel set as the central signal value SS may be varied depending on the target region.

Figure 5B:
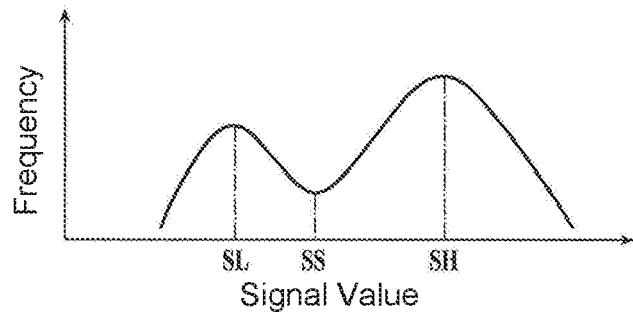

For the histogram with two local maxima in a graph as shown in FIGS. 5A and 5B, the signal value corresponding to the minimum between the two local maxima may be set as the central signal value, as shown in FIG. 5B.

Figure 6:
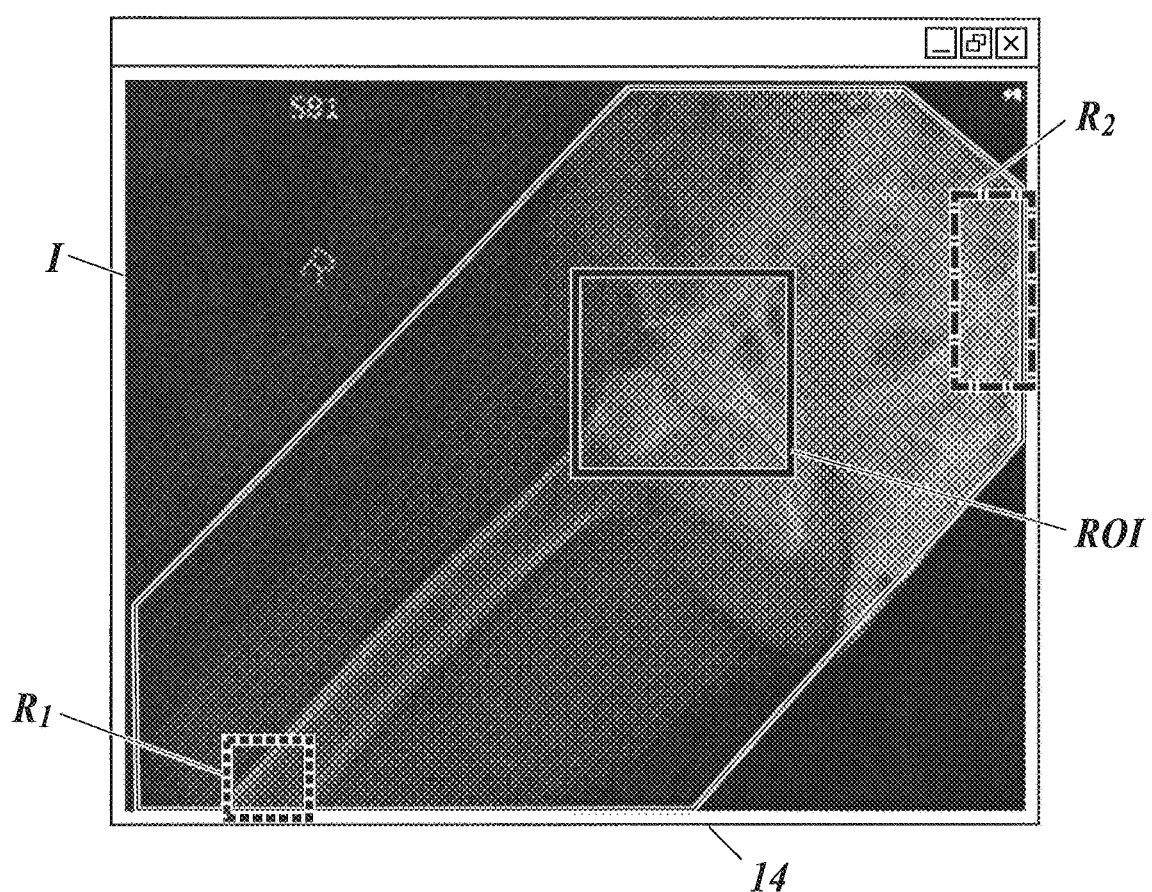
FIG. 6 is a conceptual illustration of a method for setting reference signal values using the radiographic image of FIG. 3.

On the other hand, when image recognition is used for setting the reference signal values, the central signal value SS may be set to a signal value of one of pixels in the region of interest ROI. The region of interest ROI is the region set by a user in the radiographic image I displayed on the display 14, as shown in FIG. 6, for example.

The pixel may be one with the highest (lowest) signal value in the region of interest ROI, one with the highest frequency, one with the median signal value, one with the signal value most proximate to the average, or any other arbitrary one.

The high signal value SH and the low signal value SL are preferably set to nearly the highest signal value and the lowest signal value in the target region.

When a histogram is used, in view of stable selection of pixels without blown-out highlight or blocked-up shadow, the high signal value SH or the low signal value SL may be set to a signal value of a pixel at a predetermined number (at 1st percentile of the signal values making up the target region, for example), ordered from the highest (lowest) signal value, as shown in FIG. 5A.

For the histogram with two local maxima in a graph as shown in FIGS. 5A and 5B, the signal value corresponding to the maximum on the side of lower signal values may be set as the low signal value SL and the signal value corresponding to the maximum on the side of the higher signal values may be set as the high signal value SH, as shown in 5B.

Figure 7:
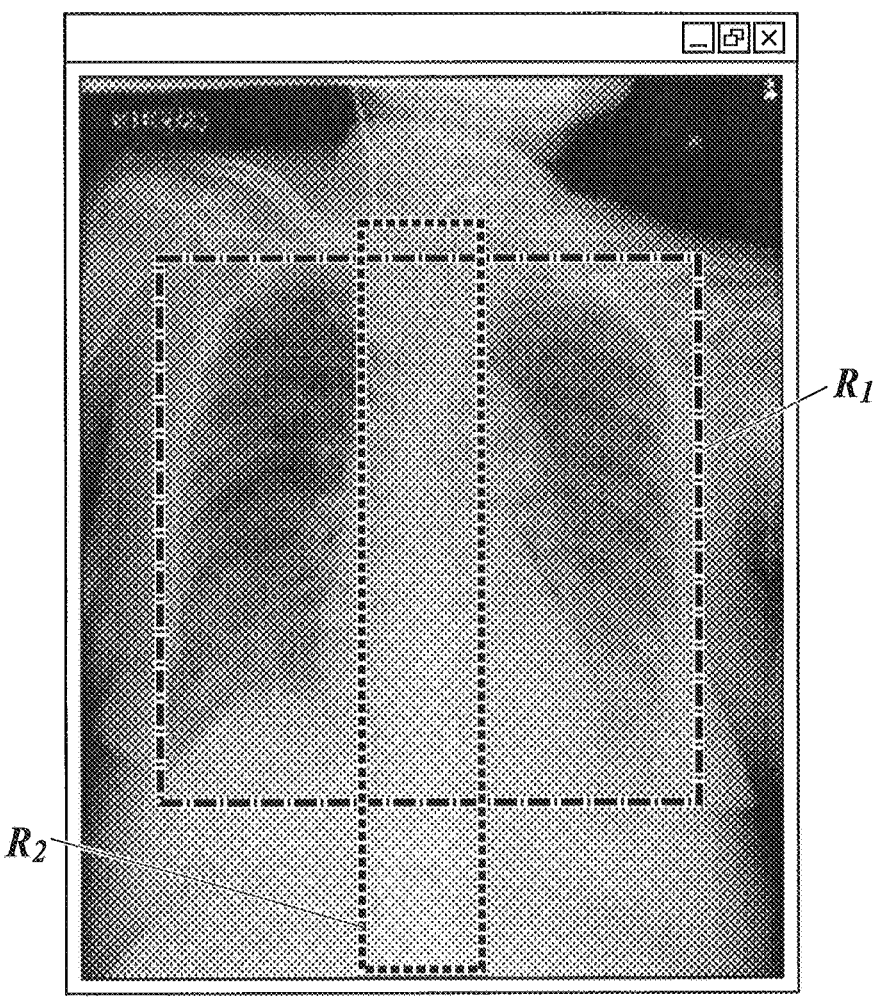
FIG. 7 is a conceptual illustration of a method for setting reference signal values using another radiographic image.

On the other hand, when image recognition is used, the first specific region $R_1$ (with high signal values) which has the lowest brightness in the target region and the second specific region $R_2$ (with low signal values) which has the highest brightness are recognized first. For example, in the radiographic image I of femur shown in FIG. 6, the middle section of femur is the first specific region $R_1$ and the pelvis is the second specific region. On the other hand, in the radiographic image of chest shown in FIG. 7, the lung region is the first specific region $R_1$ and the centrum is the second specific region $R_2$. A specific signal value in the first specific region $R_1$ is set as the high signal value SH and a specific signal value in the second specific region $R_2$ is set as the low signal value SL. The specific values are, for example, the highest signal value, the most frequent signal value, the medium value, or the average value.

When a histogram and image recognition are used in combination, the low signal value SL and the high signal value SH are set with the histogram and the central signal value SS is set in the radiographic image I according to the user's setting, for example.

The controller 11 in the present embodiment which sets the reference signal values functions as a means for setting reference signal values in the present invention.

After the reference signal values having been set, the difference in the reference values is calculated (STEP S3) Specifically, the difference between the high signal value SH and the central signal value SS denoted by SH-SS, and the difference between the central signal value SS and the low signal value SL denoted by SS-LL, are calculated.

After the differences in the reference signal values having been calculated, the range conversion rate is determined. The range conversion rate is the extent of conversion (compression or expansion) in converting the dynamic range (hereinafter referred to as DR) of the target region (STEP S4). Specifically, a conversion formula or a table to convert the difference in reference signal values to the range conversion rate is used to determine respectively the range conversion rate to convert the DR of the high signal region with signals higher than the central signal value SS in the target region and the range conversion rate to convert the DR of the low signal region with signals lower than the central signal SS in the processing object region. The controller 11 functions as a means for determining range conversion rate in the present invention.

Figure 8:
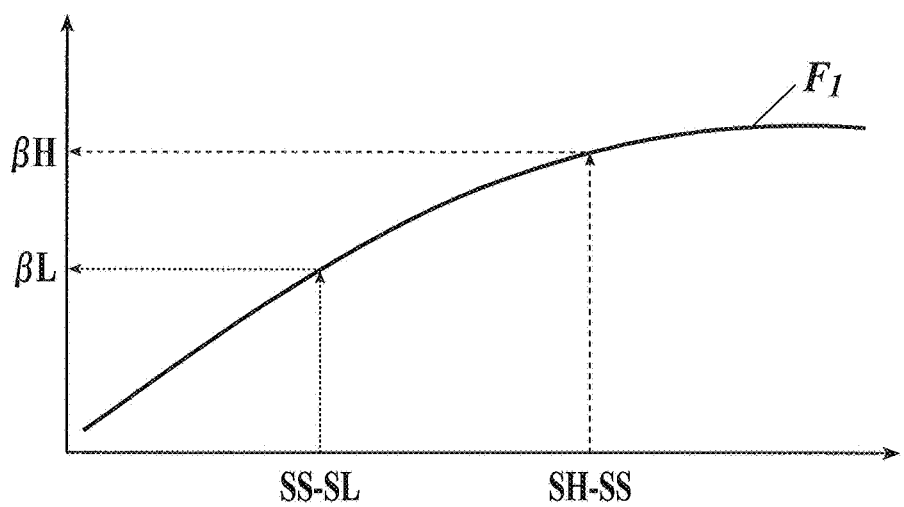
FIG. 8 is a graph of a conversion formula used in the image processing performed by the radiographic image processing device in FIG. 1.

When the conversion formula F1 is shown in the graph where the horizontal axis represents the signal value difference and the vertical axis represents the range conversion rate, a (straight or curved) line is upward sloping to the right, as shown in FIG. 8, for example. The conversion formula is determined such that a higher range conversion rate is given to a higher signal value difference. With such a conversion formula, the controller 11 determines the range conversion rate such that the signal value difference SH-SS of the high signal value SH and the central signal value SS and the signal value difference SS-SL of the central signal value SS and the low signal value SL approach each other (when SH-SS is larger than SS-SL as shown in FIG. 8, the higher DR compression is applied to the high signal region).

There may be multiple conversion formulae or tables used in STEP S4, so that one which is suitable for each imaging condition or one which can equalize two signal value differences obtained may be chosen.

A conversion formula or a table to be used may give a negative range conversion rate (which expands DR) when the signal value difference is smaller than a predetermined value.

The range conversion rate for one of the low signal region and the high signal region may be set to zero and the DR be actually converted in the other signal region only.

The determined range conversion rate may be modified according to the user's operation.

After, before, or concurrently with STEP S4, the contrast modification rate is determined. The contrast modification rate is how much contrast is modified (enhanced or decreased) (STEP S5).

Specifically, a conversion formula or a table to convert the difference in the reference signal values or the range conversion rate into the contrast modification rate is used to determine respectively the extent to which the contrast modification is performed in the high signal region with signals higher than the central signal value SS in the target region and the extent to which the contrast modification is performed in the low signal region with signals lower than the central signal value SS in the processing object region. The controller 11 functions as a means for determining contrast modification rate in the present invention.

The enhancement processing in the present embodiment may be an intensification of high frequency components such as edges or details in image (image sharpening) or a gradation processing to intensify the contrast.

Figure 9:
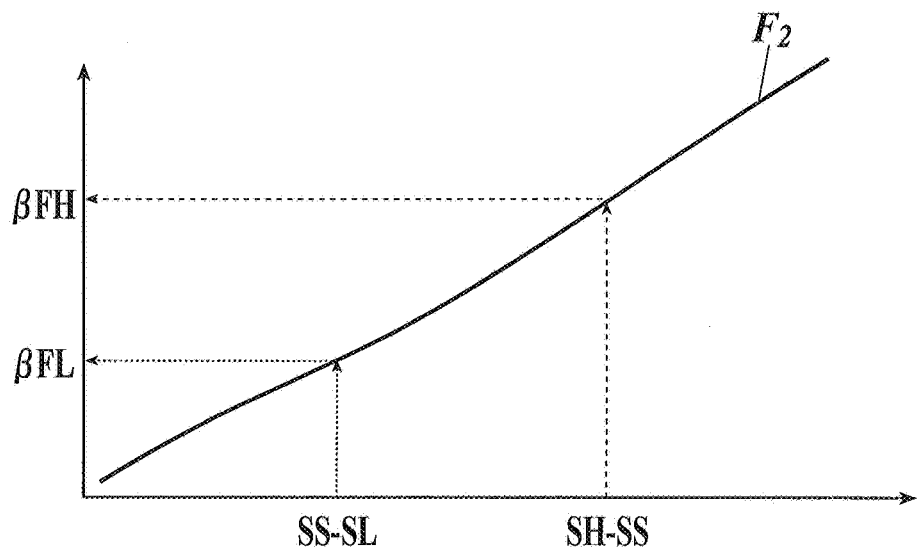
FIG. 9 is a graph of a conversion formula used in the image processing performed by the radiographic image processing device in FIG. 1.

When the conversion formula F2 is shown in the graph where the horizontal axis represents the signal value difference and the vertical axis represents the contrast modification rate, a (straight or curved) line is upward sloping to the right, as shown in FIG. 9, for example. The conversion formula is determined such that a higher contrast modification rate is given to a higher signal value difference or a higher range conversion rate. With such a conversion formula, a region with a higher signal value difference or range conversion rate is more enhanced (when SH-SS is larger than SS-SL as shown in FIG. 8, the higher contrast enhancement is applied to the high signal region).

There may be multiple conversion formulae or tables to be used in STEP S5 suitable for each target region.

A conversion formula or table to be used may give a negative contrast modification rate (which blurs image) when the signal value difference is smaller than a predetermined value or when the range conversion rate is negative.

The contrast modification rate for one of the low signal region and high signal region may be set to zero and the image intensification be performed in the other signal region.

The determined contrast modification rate may be modified according to the user's operation.

After the range conversion rate and the contrast modification rate having been determined, the DR in the signal region in the target region is modified based on the range conversion rate determined in STEP S4 corresponding to the signal region (STEP S6). The controller 11 functions as a means for converting range in the present invention.

With a conversion formula to give a higher DR conversion rate for a higher signal value difference as described above, when one signal value difference is larger than the other signal value difference in the histogram as shown in the upper histograms of FIGS. 10A to 10C, the DR is converted at a higher rate in the region with the larger signal value difference, and the signal value differences approach each other (equalized) as shown in the lower histograms of FIGS. 10A to 10C.

After the DR conversion processing having been performed, the contrast modification is performed in the signal region in the target region, according to the contrast modification rate determined in STEP S5 corresponding to the signal region (STEP S7). The controller 11 functions as a means for modifying contrast in the present invention.

With a conversion formula to give a higher contrast modification rate for a larger signal value difference or a higher range conversion rate as described above, a stronger intensification is performed in the region to which the DR compression is applied at a higher rate, and the contrasts in both signal regions are modified and generally equalized.

In the image processing in the present embodiment, the constant contrast may be maintained after density adjustment, for not only the extent of DR conversion but also the extent of image intensification is varied for each signal region.

If the effects of the contrast degradation due to the DR conversion can be estimated in advance, the processing in STEP S7 (image intensification) may be performed before STEP S6 (DR conversion).

The image processing performed on radiographic images using the radiographic image processing device 1 as described above can restrain the density fluctuation in the region of interest due to the difference of target's body thickness and maintain the constant contrast without being affected by the body thickness or the extent of DR conversion applied. As a result, it is possible to maintain the constant clarity of radiographic images without being affected by the target's body thickness.

Figure 11:
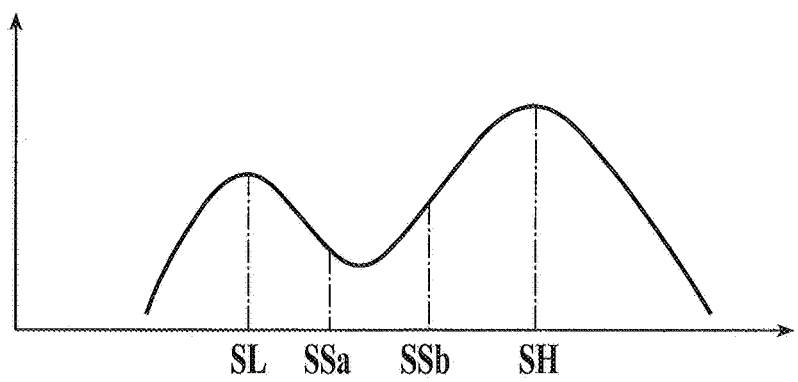
FIG. 11 is a conceptual illustration of a method for setting reference signal values performed by the radiographic image processing device using a radiographic image in accordance with a modification example of the present embodiment.

The range conversion rate may be determined depending on the target region, as shown in FIG. 11, such that multiple central signal values, that is, the first central signal value SSa and the second central signal value SSb which is larger than the first central signal value SSa, are set and the difference between the high signal value SH and the second central signal value SSb and the difference between the first central signal value SSa and the low signal value SL approach each other (generally equalized). The first central signal value SSa and the second central signal value SSb respectively correspond to the fourth reference signal value and the fifth reference signal value in the present invention.

In that way the DR compression can be performed more finely compared to when a single central signal value SS is set.

Figure 12:
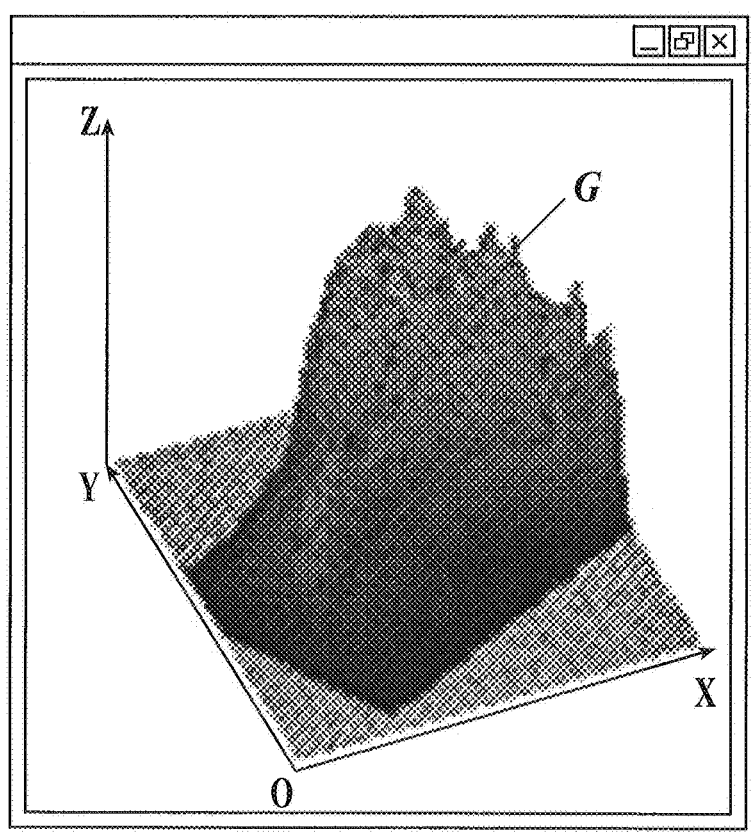
FIG. 12 is a three dimensional graph showing a distribution of body thickness generated by the radiographic image processing device in accordance with the modification example of the present embodiment.

The radiographic image may be converted into the distribution of body thickness (a three-dimensional graph G with X and Y representing coordinates of the pixel in the radiographic image and Z representing the body thickness at the pixel, as shown in FIG. 12, for example) and a histogram in which the horizontal axis represents the body thickness be generated. The reference signal values may then be set from the histogram. In that case, the controller 11 functions as a means for inferring body thickness in the present invention.

Imaging conditions such as a tube voltage value, mAs value, and SID or physical information such as height and weight may be used for precision improvement in obtaining the distribution of body thickness.

In imaging a target with the same body thickness, the signal values differ according to the tube voltage. However, the difference of tube voltage less affects the signal values in that way.

A predetermined image processing for generating an image for display may be performed on image data input by the input/output unit 12, where the processed image data is generated, and the reference signal values may be set based on the processing object region in the processed image based on the processed image data. In that case, the controller 11 functions as a means for processing image in the present invention.

This makes it possible to deal with the fluctuation of density in an image as a whole due to the modification of G value or LUT (look up table) from the original RAW image.

The noise suppression rate by which the noise generated in the signal region where the image is intensified is suppressed may be determined based on the reference signal values, range conversion rate, or contrast modification rate. The noise in the signal region in the processing object region may be suppressed based on the determined noise suppression rate corresponding to the signal region. In that case, the controller 11 functions as a means for determining a noise suppression rate and a means for suppressing noise in the present invention.

The granularity is often worsened when the contrast is intensified by the contrast modification. However, the noise can be suppressed even when a contrast modification is performed at a high rate.

Figure 13A:
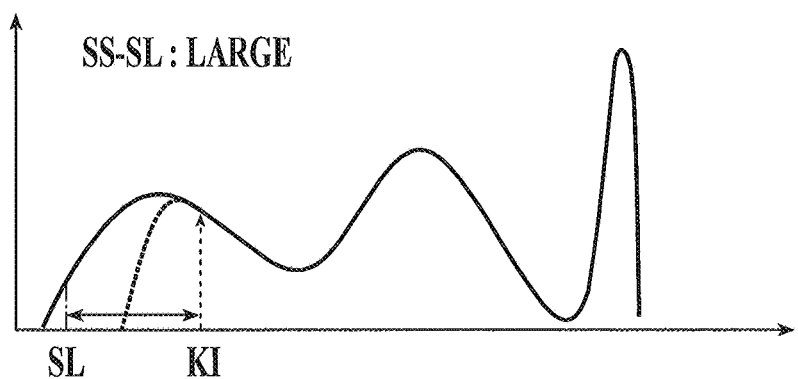
FIGS. 13A to 13C are conceptual illustrations of a method for converting the dynamic range performed by the radiographic image processing device in accordance with the modification example of the present embodiment.
Figure 13B:
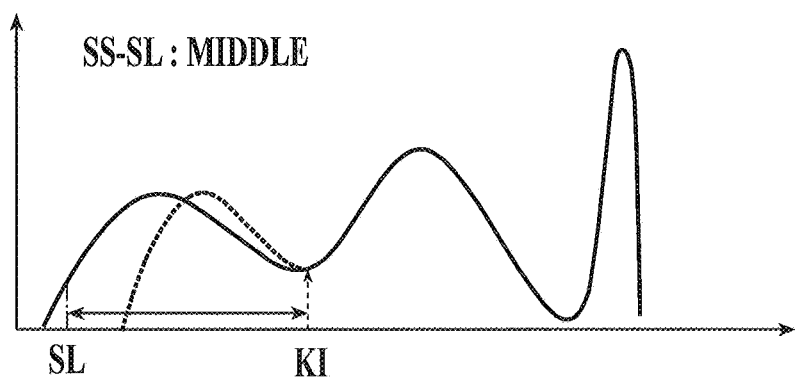
Figure 13C:
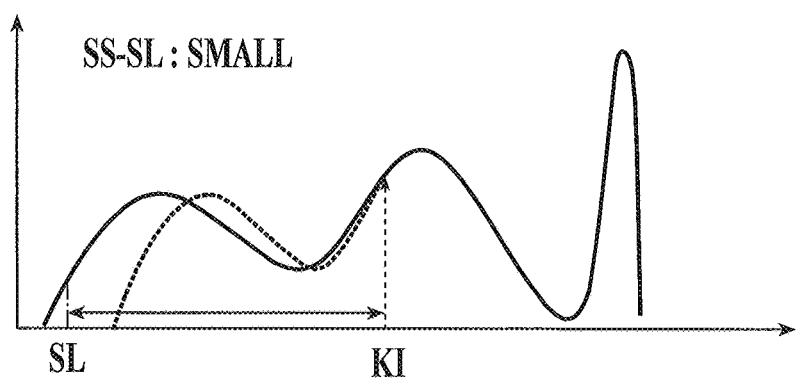

The signal value at which the DR conversion starts may be varied according to the signal value difference. In the low signal region, for example, the DR conversion processing is performed in a range between the signal value KI which is displaced on the lower signal side from the central signal value SS and the low signal value SL when the signal value difference is rather large, as shown in FIG. 13A. The DR conversion processing is performed in a range between the signal value KI which is displaced on the higher signal side from the central signal value SS and high signal value SH when the signal value difference is rather small, as shown in FIG. 13C.

In that way, the balance of the DR conversion in the high signal region and the low signal region can be varied, disregarding the central signal value SS.

In the description hereinbefore, an HDD or a semiconductor memory is used as a computer readable medium in the present invention, though not limitative in any way.

Alternatively, a non-volatile memory such as a flash memory or a removable medium such as CD-ROM may be used as a computer readable medium.

The carrier wave may be used as a medium providing the data of the program through the communication network in the present invention.

What is claimed is:

1. A radiographic image processing device comprising a hardware processor which:

sets a reference signal value in a range of a signal value of a pixel in a processing object region in a radiographic image;

determines a dynamic range conversion rate to convert a dynamic range in a high signal region which has a signal value larger than the reference signal value in the processing object region and a dynamic range conversion rate to convert a dynamic range in a low signal region which has a signal value smaller than the reference signal value in the processing object region respectively based on the reference signal value;

determines, based on the determined dynamic range conversion rate, a contrast modification rate which indicates an extent of processing of contrast modification in the signal region where the dynamic range is converted in the processing object region;

converts a dynamic range of a signal region in the processing object region based on the determined dynamic range conversion rate corresponding to the signal region; and performs contrast modification in the signal region in the processing object region based on the determined contrast modification rate corresponding to the signal region, wherein the hardware processor determines the contrast modification rate such that a change in contrast caused by the conversion of the dynamic range according to the determined dynamic range conversion rate is compensated.

2. The radiographic image processing device according to claim 1, wherein the hardware processor sets at least a first reference signal value, a second signal value which is smaller than the first reference signal value, and a third reference signal value which is larger than the first reference signal value as the reference signal value, and determines the dynamic range conversion rate such that a difference between the third reference signal value and the first reference signal value and a difference between the first reference signal value and the second reference signal value approach each other.

3. The radiographic image processing device according to claim 1, wherein the hardware processor determines the contrast modification rate such that the contrast is enhanced when the dynamic range conversion rate determined by the hardware processor is to compress the dynamic range.

4. The radiographic image processing device according to claim 1, wherein the hardware processor recognizes a target region in which a target is taken in the radiographic image as the processing object region.

5. The radiographic image processing device according to claim 1, wherein the hardware processor generates a histogram in which a horizontal axis represents a predetermined amount of characteristic in the processing object region and a vertical axis represents a frequency of the amount of characteristic, and sets the reference signal value based on a form of the generated histogram.

6. The radiographic image processing device according to claim 5, wherein the hardware processor infers a distribution of body thickness of a target in the radiographic image, and generates a histogram in which a horizontal axis represents the inferred body thickness.

7. The radiographic image processing device according to claim 1, comprising a display on which the radiographic image can be displayed,
wherein the hardware processor sets a predetermined signal value in a region specified by a user in the radiographic image displayed on the display as the reference signal value.

8. The radiographic image processing device according to claim 2,
wherein the hardware processor can set a fourth reference signal value and a fifth reference signal value which is larger than the fourth signal value as the first reference value, and
wherein the hardware processor determines the dynamic range conversion rate such that a difference between the third signal value and the fifth signal value and a difference between the fourth signal value and the second signal value approach each other when the fourth signal value and the fifth signal value are determined.

9. The radiographic image processing device according to claim 1, comprising an input/output unit which can input and output image data of a radiographic image,
wherein the hardware processor generates processed image data by performing a predetermined image processing on image data input by the input/output unit, and
wherein the hardware processor sets the reference signal value based on the processing object region in the processed image based on the processed image data.

10. The radiographic image processing device according to claim 1,
wherein the hardware processor determines a noise suppression rate to suppress noise generated in a signal region where a contrast is modified based on the reference signal value, the dynamic range conversion rate or the contrast modification rate, and suppresses noise in the signal region in the processing object region based on the determined noise suppression rate corresponding to the signal region.

11. A non-transitory computer readable storage medium storing a program for causing a computer which can perform a processing of converting a dynamic range and a processing of modifying a contrast on a radiographic image to perform:
setting a reference signal value in a range of a signal value of a pixel in a processing object region in a radiographic image;
determining a dynamic range conversion rate to convert a dynamic range in a high signal region which has a signal value larger than the reference signal value in the processing object region and a dynamic range conversion rate to convert a dynamic range in a low signal region which has a signal value smaller than the reference signal value in the processing object region respectively based on the reference signal value;
determining, based on the dynamic range conversion rate, a contrast modification rate which indicates an extent of processing of contrast modification in the signal region where the dynamic range is converted in the processing object region;
converting a dynamic range of a signal region in the processing object region based on the determined dynamic range conversion rate corresponding to the signal region; and
performing contrast modification in the signal region in the processing object region based on the determined contrast modification rate corresponding to the signal region,
wherein the contrast modification rate is determined such that a change in contrast caused by the conversion of the dynamic range according to the determined dynamic range conversion rate is compensated.

12. A radiographic image processing method comprising:
setting a reference signal value in a range of a signal value of a pixel in a processing object region in a radiographic image;
determining a dynamic range conversion rate to convert a dynamic range in a high signal region which has a signal value larger than the reference signal value in the processing object region and a dynamic range conversion rate to convert a dynamic range in a low signal region which has a signal value smaller than the reference signal value in the processing object region respectively based on the reference signal value;
determining, based on the dynamic range conversion rate, a contrast modification rate which indicates an extent of processing of contrast modification in the signal region where the dynamic range is converted in the processing object region;
converting a dynamic range of a signal region in the processing object region based on the determined dynamic range conversion rate corresponding to the signal region; and
performing contrast modification in the signal region in the processing object region based on the determined contrast modification rate corresponding to the signal region,
wherein the contrast modification rate is determined such that a change in contrast caused by the conversion of the dynamic range according to the determined dynamic range conversion rate is compensated.

* * * * *